(12) United States Patent
Li et al.

(10) Patent No.: US 10,059,850 B2
(45) Date of Patent: Aug. 28, 2018

(54) PAINT FORMULATION AND THE PROCESS OF MAKING THEREOF

(71) Applicants: Dow Global Technologies LLC, Midland, MI (US); Rohm and Haas Company, Philadelphia, PA (US); UCAR Emulsion Systems FZE, Dubai (AE)

(72) Inventors: Ling Li, Shanghai (CN); Yujiang Wang, Shanghai (CN); Fengkun Chen, Kyoto (JP); Rui Wang, Shanghai (CN); Khaled Abou Ghoneim, Dubai (AE); Liqiang Fan, Shanghai (CN)

(73) Assignees: Dow Global Technologies LLC, Midland, MI (US); Rohm and Haas Company, Philadelphia, PA (US); UCAR Emulsion Systems FZE, Dubai (AE)

( * ) Notice: Subject to any disclaimer, the term of this patent is extended or adjusted under 35 U.S.C. 154(b) by 0 days.

(21) Appl. No.: 15/513,255

(22) PCT Filed: Sep. 25, 2014

(86) PCT No.: PCT/CN2014/087424
§ 371 (c)(1),
(2) Date: Mar. 22, 2017

(87) PCT Pub. No.: WO2016/045048
PCT Pub. Date: Mar. 31, 2016

(65) Prior Publication Data
US 2017/0298237 A1 Oct. 19, 2017

(51) Int. Cl.
| | | |
|---|---|---|
| C09D 7/43 | (2018.01) | |
| C09D 7/65 | (2018.01) | |
| C09D 7/00 | (2018.01) | |
| C09D 5/02 | (2006.01) | |
| C09D 7/12 | (2006.01) | |
| C09D 5/44 | (2006.01) | |
| C09D 7/40 | (2018.01) | |

(52) U.S. Cl.
CPC ............ *C09D 7/43* (2018.01); *C09D 5/02* (2013.01); *C09D 5/4411* (2013.01); *C09D 5/4442* (2013.01); *C09D 7/002* (2013.01); *C09D 7/12* (2013.01); *C09D 7/40* (2018.01); *C09D 7/65* (2018.01)

(58) Field of Classification Search
CPC .................................. C09D 7/43; C09D 7/65
See application file for complete search history.

(56) References Cited

U.S. PATENT DOCUMENTS

| | | | |
|---|---|---|---|
| 3,950,283 A | 4/1976 | Sellars et al. | |
| 5,114,485 A | 5/1992 | Lynch et al. | |
| 5,504,123 A * | 4/1996 | Partan, III | ............ C08B 11/187 524/42 |
| 5,785,749 A | 7/1998 | Knesek et al. | |
| 6,063,857 A * | 5/2000 | Greenblatt | ................ C08F 2/22 524/48 |
| 6,488,760 B1 * | 12/2002 | Binns | .................... C09B 67/006 106/401 |
| 9,155,549 B2 | 10/2015 | Fasula et al. | |
| 9,631,115 B2 * | 4/2017 | Weier | ................... C09D 167/00 |
| 2004/0151886 A1 * | 8/2004 | Bobsein | ............. C09D 133/064 428/211.1 |
| 2008/0103248 A1 * | 5/2008 | Suau | ..................... A61K 8/8152 524/548 |
| 2008/0227892 A1 * | 9/2008 | van der Wielen | ........ C08L 1/26 524/44 |
| 2010/0324177 A1 * | 12/2010 | Bakeev | ................ C07D 303/12 524/35 |
| 2011/0256085 A1 * | 10/2011 | Talingting Pabalan | ..................... A61K 8/042 424/70.13 |
| 2012/0115999 A1 * | 5/2012 | Peera | ..................... C09D 7/002 524/249 |
| 2013/0116368 A1 * | 5/2013 | Suau | ......................... C09D 7/43 524/156 |
| 2013/0131259 A1 * | 5/2013 | Suau | ........................ C08L 33/10 524/556 |
| 2014/0114012 A1 * | 4/2014 | Fasula | ................ A61B 17/1655 524/523 |
| 2014/0178324 A1 * | 6/2014 | Martinez-Castro | ..... E21B 43/26 424/70.16 |

(Continued)

FOREIGN PATENT DOCUMENTS

| | | |
|---|---|---|
| CN | 101397433 A | 4/2009 |
| EP | 0780449 A2 | 6/1997 |

(Continued)

OTHER PUBLICATIONS

International Preliminary Report on Patentability for International Application No. PCT/CN2014/087424; International Filing Date: Sep. 25, 2014; dated Jun. 16, 2015; 5 pages.

(Continued)

*Primary Examiner* — Liam J Heincer
(74) *Attorney, Agent, or Firm* — Karl E. Stauss; Cantor Colburn LLP

(57) ABSTRACT

The present invention provides a paint formulation comprising a binder dispersion and a hydrophobically modified alkali-swellable emulsion. The wet weight ratio of the binder dispersion to the hydrophobically modified alkali-swellable emulsion is from 1:3 to 1:10. The binder dispersion comprises by dry weight based on total dry weight of the binder dispersion, from 0.1% to 80% of polymer particles, and from 0.1% to 5% of a polysaccharide; and the hydrophobically modified alkali-swellable emulsion comprises by dry weight based on total dry weight of the hydrophobically modified alkali-swellable emulsion, from 30% to 50% of an α,β-ethylenically unsaturated carboxylic acid monomer, and from 30% to 60% of an α,β-ethylenically unsaturated nonionic monomer. The present invention further provides a process for preparing the paint formulation comprising mixing the binder dispersion with the hydrophobically modified alkali-swellable emulsion under stirring.

11 Claims, No Drawings

(56) References Cited

U.S. PATENT DOCUMENTS

| | | | |
|---|---|---|---|
| 2014/0178325 A1* | 6/2014 | Martinez-Castro | ............................ A61K 8/8152 424/70.16 |
| 2015/0094398 A1* | 4/2015 | Carchidi | ............ C09D 133/064 523/122 |
| 2015/0148457 A1 | 5/2015 | Yun et al. | |
| 2017/0226364 A1* | 8/2017 | Zhang | .................. C09D 125/14 |
| 2017/0335133 A1* | 11/2017 | Zhang | ...................... C09D 5/29 |

FOREIGN PATENT DOCUMENTS

| | | |
|---|---|---|
| EP | 2712898 A1 | 4/2014 |
| WO | 2008112419 A2 | 9/2008 |
| WO | 2013002999 A1 | 1/2013 |

OTHER PUBLICATIONS

International Search Report for International Application No. PCT/CN2014/087424; International Filing Date: Sep. 25, 2014; dated Jun. 16, 2015; 4 pages.

Written Opinion of the International Searching Authority for International Application No. PCT/CN2014/087424; International Filing Date: Sep. 25, 2014; dated Jun. 16, 2015; 4 pages.

\* cited by examiner

PAINT FORMULATION AND THE PROCESS OF MAKING THEREOF

FIELD OF THE INVENTION

The present invention relates to a paint formulation, particularly suitable for single-color and multi-color paint formulations. The present invention further relates to the process of making such paint formulations.

INTRODUCTION

Single-color paints contain only one colorant, while multi-color paints contain at least two different colorants. The colorants are desirably well distributed and stably protected in the paints before applications. Research has been conducted to provide paint formulations to both protect and well disperse the colorant therein. Such paint formulations usually comprise clay to protect the colorant. However, clay could be expensive, and often brings instability issues and provides limited choices of paint appearance. Clay-based paint formulations only work well with the spraying application method. Thus, research has been focusing on the development of a new paint formulation comprising less clay for both single-color and multi-color paint formulations.

It is therefore desired in the industry a paint formulation, particularly suitable for single-color and multi-color paint formulations, with improved viscosity stability and customizable paint appearance. These paint formulations can be applied by not only spraying, but rolling and brushing as well.

SUMMARY OF THE INVENTION

The present invention provides a paint formulation comprising a binder dispersion and a hydrophobically modified alkali-swellable emulsion. The wet weight ratio of the binder dispersion to the hydrophobically modified alkali-swellable emulsion is from 1:3 to 1:10. The binder dispersion comprises by dry weight based on total dry weight of the binder dispersion, from 0.1% to 80% of polymer particles, and from 0.1% to 5% of a polysaccharide; and the hydrophobically modified alkali-swellable emulsion comprises by dry weight based on total dry weight of the hydrophobically modified alkali-swellable emulsion, from 30% to 50% of an $\alpha,\beta$-ethylenically unsaturated carboxylic acid monomer, and from 30% to 60% of an $\alpha,\beta$-ethylenically unsaturated nonionic monomer.

The present invention further provides a process for preparing the paint formulation comprising mixing the binder dispersion with the hydrophobically modified alkali-swellable emulsion under stirring.

DETAILED DESCRIPTION OF THE INVENTION

The paint formulation of the present invention comprises a binder dispersion and a hydrophobically modified alkali-swellable emulsion. The wet weight ratio of the binder dispersion to the hydrophobically modified alkali-swellable emulsion is from 1:3 to 1:10, preferably from 1:4 to 1:8, and more preferably from 1:4 to 1:6.

The Binder Dispersion

The binder dispersion comprises from 0.1% to 80%, preferably from 1% to 60%, and more preferably from 2% to 40% by dry weight based on total dry weight of the binder dispersion, polymer particles.

The polymer particles comprise, as polymerization units, at least one $\alpha,\beta$-ethylenically unsaturated nonionic monomer that is $\alpha,\beta$-ethylenically unsaturated monomer without bearing an ionic charge between pH=1-14. Suitable examples of the $\alpha,\beta$-ethylenically unsaturated nonionic monomers include (meth)acrylic ester monomers, i.e., methacrylic ester or acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, and lauryl methacrylate; (meth)acrylonitrile; styrene and substituted styrene such as $\alpha$-methyl styrene, and vinyl toluene; butadiene; ethylene; propylene; $\alpha$-olefin such as 1-decene; vinyl esters such as vinyl acetate, vinyl butyrate, and vinyl versatate; and other vinyl monomers such as vinyl chloride and vinylidene chloride. Preferably, the $\alpha,\beta$-ethylenically unsaturated nonionic monomers are ethyl acrylate, methyl methacrylate, 2-hydroxybutyl acrylate, 2-hydroxyethyl methacrylate, 2-hydroxypropyl methacrylate, vinyl acetate, acrylonitrile, and any combination thereof.

Optionally, the polymer particles may further comprise from 0.1% to 10%, and preferably from 0.5% to 5% by dry weight based on total dry weight of the polymer particles, an ethylenically unsaturated monomer carrying at least one functional group selected from carboxyl, carboxylic anhydride, hydroxyl, amide, amino, ureido, acetoacetate, sulphonate, phosphonate and any combination thereof. Suitable examples of these monomers are ethylenically unsaturated carboxylic or dicarboxylic acid such as acrylic or methacrylic acid, itaconic acid, and maleic acid; the amide such as such as (meth)acrylamide; N-alkylolamide such as N-methylol(meth)acrylamide and 2-hydroxyethyl(meth)acrylamide; hydroxyalkyl ester of the above-mentioned carboxylic acid, such as hydroxyethyl (meth)acrylate and hydroxypropyl (meth)acrylate; amino-functional monomers such as N,N-Dimethylaminoethyl methacrylate; ureido-functional monomers such as methacrylamidoethyl-2-imidazolidinone; or monomers bearing acetoacetate-functional groups such as acetoacetoxyethyl methacrylate.

The binder dispersion further comprises from 0.1% to 5%, preferably from 0.3% to 3%, and more preferably from 0.5% to 2% by dry weight based on total dry weight of the binder dispersion, a polysaccharide. Suitable examples of the polysaccharides are selected from methylcellulose (MC), hydropropylmethylcellulose (HPMC), hydroxyethylmethylcellulose (HEMC), hydroxybutylmethylcellulose (HBMC), hydroxyethylethylcellulose (HEEC), guar, pectin, carrageenan, gelatin, and any combination thereof. Preferably, the polysaccharides are selected from methylcellulose (MC), hydropropylmethylcellulose (HPMC), hydroxyethylmethylcellulose (HEMC), guar, gelatin, and any combination thereof.

Optionally, the binder dispersion may further comprise from 0.1% to 5%, preferably from 0.5% to 3%, and more preferably from 1% to 2% by dry weight based on total dry weight of the binder dispersion, clay.

The clay refers to hydrous phyllosilicates with variable amounts of iron, magnesium, alkali metals, aluminum, alkaline earths, and other cations. Suitable examples of the clay include lithium magnesium silicate commercially available as LAPONITE™ RD and LAPONITE RDS from Rockwood Additives Ltd., and aluminum magnesium silicate commercially available under the VEEGUM™ brand [trademarks are used as adjectives, not nouns] from Vanderbilt Company, Inc.

Optionally, the binder dispersion may further comprise from 0.05% to 5%, preferably from 0.1% to 3%, and more preferably from 0.5% to 2% by dry weight based on total dry weight of the binder dispersion, at least one colorant. The colorants are organic or inorganic, and are preferably inorganic colorants. Suitable examples of the colorants are selected from titanium dioxide white, carbon black, lampblack, black iron oxide, red iron oxide, transparent red oxide, yellow iron oxide, transparent yellow oxide, brown iron oxide, phthalocyanine green, phthalocyanine blue, naphthol red, quinacridone red, quinacridone magenta, quinacridone violet, DNA orange, organic yellow, and any combination thereof.

Optionally, the binder dispersion may further comprise other additives selected from pigment, extender, coalescing agents, cosolvents, surfactants, buffers, neutralizers, thickeners, non-thickening rheology modifiers, dispersants, humectants, wetting agents, mildewcides, biocides, plasticizers, antifoaming agents, defoaming agents, anti-skinning agents, flowing agents, crosslinkers, and anti-oxidants.

The pigments are particulate inorganic materials that are capable of contributing opacity or hiding capability to dispersions and typically have a refractive index of greater than 1.8. Suitable examples of the pigments are selected from titanium dioxide ($TiO_2$), zinc oxide, zinc sulfide, barium sulfate, barium carbonate, lithopone, and any combination thereof. $TiO_2$ is preferred.

The extenders are particulate inorganic materials having a refractive index of less than or equal to 1.8 and greater than 1.3. Suitable examples of the extenders are calcium carbonate, calcium sulfate, aluminosilicates, silicates, zeolites, mica, diatomaceous earth, $Al_2O_3$, zinc phosphate, solid or hollow glass, ceramic beads, and any combination thereof.

The binder dispersion further comprises water so that total wet weight percent of the binder dispersion reaches 100%.

The binder dispersion is prepared by simply mixing the binder components under stirring until the binder dispersion is formed.

The Hydrophobically Modified Alkali-swellable Emulsion (HASE)

The hydrophobically modified alkali-swellable emulsion (HASE) comprises by dry weight based on total dry weight of the HASE, from 30% to 50%, preferably from 35% to 47%, and more preferably from 40% to 45%, an α,β-ethylenically unsaturated carboxylic acid monomer; and from 30% to 60%, preferably from 40% to 55%, and more preferably from 45% to 50%, the α,β-ethylenically unsaturated nonionic monomer.

The α,β-ethylenically unsaturated carboxylic acid monomers are α,β-ethylenically unsaturated monomers containing at least one carboxylic acid group. Suitable examples of the α,β-ethylenically unsaturated carboxylic acid monomers include monobasic acids, such as acrylic, methacrylic, crotonic, and acyloxypropionic acid; and dibasic acid monomers, such as maleic, fumaric, and itaconic acid. In some embodiments, the dibasic acid monomers are used in place of a portion, e.g., up to about 10 weight percent, of the monobasic acid. Monoesters of the dibasic acid monomers, such as monobutyl ester of maleic acid can also be used. Preferably, the α,β-ethylenically unsaturated carboxylic acid monomers are acrylic acid, methacrylic acid, and any combination thereof.

Optionally, the HASE may further comprises from 1% to 20%, preferably from 2% to 15%, and more preferably from 3% to 10%, by dry weight based on total dry weight of the HASE, a nonionic macromonomer.

The nonionic macromonomers have the formula:

wherein R is H or $CH_3$; $R^1$ is $C_1$-$C_2$ alkyl; $R^2$ is $C_8$-$C_{30}$ alkyl, $C_8$-$C_{16}$ alkyl phenyl or $C_{13}$-$C_{36}$ aralkyl phenyl; n is an integer from 6 to 100 and m is an integer from 0 to 50, provided that n≥m and m+n is from 6 to 100. Preferably, m=0, and n is an integer from 10 to 60; and more preferably, m=0, and n is an integer from 20 to 40.

Suitable examples of the nonionic macromonomers include ethoxylated behenyl methacrylates commercially available as SIPOMER™ BEM (50% active), polyalkoxyl polyarylphenol ethylenic methacrylates commercially available as SIPOMER SEM-25 (60% active), methacrylic ester monomers commercially available as SIPOMER HPM-100 (50% active), methacrylic esters commercially available as SIPOMER HPM-200 (50% active) and SIPOMER HPM-400 (50% active) from Solvay Chemicals, Inc., and methacrylate ester alcohol (MACS). Preferred examples are ethoxylated behenyl methacrylates, and methacrylic esters. More preferred examples are SIPOMER BEM (50% active), and SIPOMER HPM-400 (50% active).

The hydrophobically modified alkali-swellable emulsion (HASE) is prepared by emulsion polymerization well-known in the art.

It should be noticed that the HASE of the present invention is conventionally used as a thickener at a use amount of from 1% to 3% by wet weight based on total wet weight of a paint formulation. In the present invention, the HASE is not used as a thickener and is used at a much higher wet concentration, that is, from 75% to 91% based on total wet weight of the paint formulation (considering the wet weight ratio of the binder dispersion to the HASE is from 1:3 to 1:10). In addition, if the HASE is used as a thickener, pH adjusting agent should be used to adjust its pH to be at least 7 so that the HASE could be neutralized to release into the system for thickening. PH adjusting agent is not necessarily used in the present invention. Preferably, pH adjusting agent is not used in the present invention.

The Paint Formulation

The paint formulation is prepared by mixing the binder dispersion with the HASE at the recommended wet weight ratio disclosed above. Preferably, the binder dispersion is dropped into the HASE followed by mixing.

The Single-color Paint Formulation

In one embodiment where the binder dispersion comprises one single colorant, the paint formulation made thereof is the single-color paint formulation.

The Multi-color Paint Formulation

In another embodiment where multiple single-color paint formulations were mixed together, the paint formulation made thereof is the multi-color paint formulation. The multi-color paint formulation may also be prepared by respectively dropping multiple binder dispersions, each comprises one single colorant, into one hydrophobically modified alkali-swellable emulsion followed by mixing.

EXAMPLES

I. Raw Materials

| Chemical name | Abbreviation |
|---|---|
| methacrylic acid | MAA |
| ethyl acrylate | EA |
| n-dodecyl mercaptan | n-DDM |
| ammonium persulfate | APS |
| tert-butylhydroperoxide | t-BHP |
| isoascorbic acid | IAA |
| methacrylate ester alcohol | MACS |
| ammonium persulfate | APS |

| Ingredient | Supplier |
|---|---|
| Guar (5500-6000 cps, 200 mesh) | Shree Ram Industries |
| Gelatin (fine grade) | Sinopharm Chemical Reagent Co., Ltd. |
| NEXIRA™ Instantgum AA gum arabic (Instrantgum) | Jebson Company |
| METHOCEL™ A 4M methylcellulose (A 4M) | The Dow Chemical Company |
| METHOCEL A 40M methylcellulose (A 40M) | The Dow Chemical Company |
| METHOCEL K 100M hydroxypropylmethylcellulose (K 100M) | The Dow Chemical Company |
| WALOCEL™ CRT 20000 carboxylmethylcellulose (CRT 20000) | The Dow Chemical Company |
| LAPONITE™ RD clay (RD) | Rockwood Additives Ltd. |
| PRIMAL™ AC 818 acrylic emulsion (AC 818) | Dow Chemical Company |
| PRIMAL AC 261P acrylic emulsion (AC 261P) | Dow Chemical Company |
| SIPOMER™ BEM monomer | Solvay Chemicals |
| DISPONIL™ FES 32 emulsifier | BASF Corporation |
| KATHON™ LX biocide (1.5% active) | The Dow Chemical Company |
| Red colorant | ICC, International Chemical Corporation |

II. Test Method

1. Colorant Protection

Binder dispersions comprising the red colorant were added into HASEs with stirring (>600 rpm) to make single-color paints. These paints were observed for color release by naked eyes. If the red colorant was protected in the binder dispersion, red color would be kept or limited in a particular area of the paint and there would be a clear boundary between the colored area and the non-colored area. This phenomenon was recorded as "protected" in the result section. If the red colorant was not protected in the binder dispersion, red color would not be kept or limited in a particular area of the paint and there would not be a clear boundary between the colored area and the non-colored area. This phenomenon was recorded as "released" in result section.

2. Viscosity Stability

A Stormer viscometer was used to test the viscosity of a paint formulation according to the ASTM (American Society for Testing and Materials) D562 method. After the paint formulation was formed, an initial medium shear viscosity, Initial KU, of the paint formulation was tested at room temperature. The paint formulation was then placed in an oven at 50° C. for 10 days. The viscosity of the paint formulation after storage was tested and recorded as Final KU. The difference between Initial KU and Final KU is defined as the viscosity change, ΔKU. The smaller the total ΔKU value is, the better the viscosity stability is.

III. Experimental Examples

1. Preparation of the Binder Dispersions

Powders of polysaccharide were dispersed into water by stirring at 200-1500 rpm for 5 min, and then incubated at 60-90° C. for 10 min with stirring at 500-2000 rpm. When the powders were dissolved, an aqueous dispersion of polymer particles, optionally clay, optionally a colorant, and optionally paint additives were added into the powder dispersion with stirring at 2000 rpm for 20 min

2. Preparation of the Hydrophobically Modified Alkali-swellable Emulsions (HASE) 1 to 3

Preparation of HASE 1: A five-liter, four-necked flask equipped with a mechanical stirrer, a nitrogen sweep, a thermocouple, and a condenser was charged with 720.00 g of water and 32.17 g of DISPONIL FES 32 emulsifier, and was heated at 86° C. An initiator, 1.30 g of APS dissolved in 31.00 g of water, was added. Two minutes later, the monomer emulsion, 583.74 g of EA, 565.11 g of MAA, 124.20 g SIPOMER BEM monomer, and 32.17 g of DISPONIL FES 32 emulsifier and 0.74 g of n-DDM in 900.00 g of water, and an initiator, 0.56 g of APS dissolved in 115.5 g of water, were co-fed over a period of 80 minutes while the flask temperature was maintained at 86° C. The flask temperature was held at 86° C. for ten minutes after the end of the feed and then was cooled to 60° C. A chaser system, 30.80 g of FeSO$_4$ solution (0.15%), 1.66 g of t-BHP in 19.00 g of water and 0.83 g of IAA in 27.00 g of water were then added. After holding at 60° C. for 15 minutes, the same chaser system was charged again. The flask was cooled to 40° C., and a buffer solution of 2.19 g of NaAc in 258.00 g of water was added over 10 minutes, then a biocide solution of 7.41 g of KATHON LX biocide (1.5% active) in 28.00 g of water was added over 10 minutes. After the completion of polymerization, the polymer emulsion was cooled to ambient temperature and filtered through a 325 mesh size screen. The resulting polymer emulsion was HASE 1.

HASEs 2 and 3 were prepared according to the above procedure for the preparation of HASE 1, with HASE 2 having a monomer composition of 50EA/43MAA/7MACS, and HASE 3 having a composition of 65EA/35MAA.

3. Preparation of the Paint Formulations

The binder dispersion was poured into the HASE under stirring at 100-1500 rpm for 5 min to prepare the paint formulation. Corresponding binder dispersion and HASE for each paint formulation was listed in Table 1.

TABLE 1

| | | Binder (100% by dry weight) | | |
|---|---|---|---|---|
| Paint | Polymer | Polysaccharide | Clay | HASE |
| 1* | 40% AC 818 | 1.2% A 40M, 0.4% guar, 0.4% gelatin | 0.5% RD | HASE 2 |
| 2 | 40% AC 818 | 1.2% A 40M, 0.4% guar, 0.4% gelatin | 0.5% RD | HASE 2 |
| 3 | 40% AC 818 | 1.2% A 40M, 0.4% guar, 0.4% gelatin | 0.5% RD | HASE 2 |
| 4 | 20% AC 818 | 1.2% A 40M, 0.4% guar, 0.4% gelatin | 0.5% RD | HASE 3 |
| 5* | 10% AC 818 | 1.2% A 40M, 0.4% guar, 0.4% gelatin | 0.5% RD | HASE 1 |
| 6 | 40% AC 818 | 1.2% A 40M, 0.4% guar, 0.4% gelatin | — | HASE 2 |
| 7 | 40% AC 818 | 0.5% K 100M, 0.5% guar | 0.5% RD | HASE 1 |
| 8 | 10% AC 818 | 0.5% A 4M, 0.2% guar | 0.5% RD | HASE 1 |
| 9 | 10% AC 818 | 3% A 4M, 0.1% guar | 1% RD | HASE 1 |
| 10 | 60% AC 818 | 1.2% A 40M, 0.2% guar | 0.5% RD | HASE 2 |
| 11 | 40% AC 818 | 1.2% A 40M, 0.2% guar | — | HASE 2 |
| 12 | 40% AC 261P | 1.2% A 40M, 0.2% guar | — | HASE 2 |
| 13 | 40% AC 261P | 1.2% A 40M, 0.4% guar, 0.4% gelatin | 0.5% RD | HASE 3 |
| 14* | 40% AC 818 | 1.4% Instantgum | 0.5% RD | HASE 1 |
| 15* | 40% AC 818 | 1.5% CRT 20000 | — | HASE 2 |

*Comparative Paints.

IV. Results

TABLE 2

| Paint | Binder:HASE (by wet weight) | Colorant Protection# | ΔKU |
|---|---|---|---|
| 1* | 1:2.5 | Released | Gel |
| 2 | 1:4 | Protected | 9.3 |
| 3 | 1:6 | Protected | 4.1 |
| 4 | 1:4 | Protected | 10.3 |
| 5* | 1:1 | Released | Gel |
| 6 | 1:4 | Protected | 8 |
| 7 | 1:4 | Protected | 6 |
| 8 | 1:4 | Protected | 9 |
| 9 | 1:4 | Protected | 8 |
| 10 | 1:6 | Protected | 9 |
| 11 | 1:6 | Protected | 7 |
| 12 | 1:6 | Protected | 9 |
| 13 | 1:4 | Protected | 7.2 |
| 14* | 1:4 | Released | Gel |
| 15* | 1:4 | Released | Gel |

*Comparative Paints.
Colorant was red colorant.

As shown in Table 2, paint formulations with relatively higher wet weight ratio of the binder dispersion to the HASE (Comparative Paints 1 and 5) had poorer colorant protection (released) and viscosity stability (gel) compared to other paint formulations (Paints 2 to 4, and Paints 6 to 13).

Comparative Paints 14 and 15 used non-recommended polysaccharide, arbic gum or carboxylmethylcellulose, and were both not stable as paints (gel).

What is claimed is:

1. A paint formulation comprising a binder dispersion and a hydrophobically modified alkali-swellable emulsion, wherein the wet weight ratio of the binder dispersion to the hydrophobically modified alkali-swellable emulsion is from 1:3 to 1:10; the binder dispersion comprises by dry weight based on total dry weight of the binder dispersion, from 0.1% to 80% of polymer particles, and from 0.1% to 5% of a polysaccharide; and the hydrophobically modified alkali-swellable emulsion comprises by dry weight based on total dry weight of the hydrophobically modified alkali-swellable emulsion, from 30% to 50% of an α,β-ethylenically unsaturated carboxylic acid monomer, and from 30% to 60% of an α,β-ethylenically unsaturated nonionic monomer.

2. The paint formulation according to claim 1 wherein the polysaccharide is selected from methylcellulose, hydropropylmethylcellulose, hydroxyethylmethylcellulose, guar, gelatin, and any combination thereof.

3. The paint formulation according to claim 1 wherein the α,β-ethylenically unsaturated carboxylic acid monomer is selected from acrylic acid, methacrylic acid, and any combination thereof.

4. The paint formulation according to claim 1 wherein the polymer particles further comprise from 0.1% to 10% by dry weight based on total dry weight of the polymer particles, an ethylenically unsaturated monomer carrying at least one functional group selected from carboxyl, carboxylic anhydride, hydroxyl, amide, amino, ureido, acetoacetate, sulphonate, phosphonate, and any combination thereof.

5. The paint formulation according to claim 1 wherein the binder dispersion further comprises from 0.1% to 5% by dry weight based on total dry weight of the binder dispersion, clay.

6. The paint formulation according to claim 1 wherein the binder dispersion further comprises from 0.05% to 5% by dry weight based on total dry weight of the binder dispersion, at least one colorant.

7. The paint formulation according to claim 1 wherein the hydrophobically modified alkali-swellable emulsion further comprises from 1% to 20% by dry weight based on total dry weight of the HASE, a nonionic macromonomer having the formula $H_2C=C(R)CO_2(CH_2CH_2O)_n(CH(R^1)CH_2O)_mR^2$, wherein R is H or $CH_3$, $R^1$ is $C_1$-$C_2$ alkyl; $R^2$ is $C_8$-$C_{30}$ alkyl, $C_8$-$C_{16}$ alkyl phenyl or $C_{13}$-$C_{36}$ aralkyl phenyl; n is an integer from 6 to 100 and m is an integer from 0 to 50, provided that n≥m and m+n is from 6 to 100.

8. The paint formulation according to claim 7 wherein m=0, and n is an integer from 10 to 60.

9. A process for preparing the paint formulation of claim 1 comprising mixing the binder dispersion with the hydrophobically modified alkali-swellable emulsion under stirring, wherein the wet weight ratio of the binder dispersion to the hydrophobic ally modified alkali-swellable emulsion is from 1:3 to 1:10; the binder dispersion comprises by dry weight based on total dry weight of the binder dispersion, from 0.1% to 80% of polymer particles, and from 0.1% to 5% of a polysaccharide; and the hydrophobically modified alkali-swellable emulsion comprises by dry weight based on total dry weight of the hydrophobically modified alkali-swellable emulsion, from 30% to 50% of an α,β-ethylenically unsaturated carboxylic acid monomer, and from 30% to 60% of an α,β-ethylenically unsaturated nonionic monomer.

10. The process according to claim 9 wherein the binder dispersion was dropped into the hydrophobically modified alkali-swellable emulsion under stirring.

11. The process according to claim 9 wherein the binder dispersion further comprises from 0.05% to 5% by dry weight based on total dry weight of the binder dispersion, at least one colorant.

* * * * *